No. 753,555. PATENTED MAR. 1, 1904.
T. DOUGLAS & G. L. CONROY.
CONDENSER.
APPLICATION FILED MAY 9, 1903.
NO MODEL.

WITNESSES:
Paul Hunter
Isaac B. Owens.

INVENTORS
Thomas Douglas
George Lewis Conroy
BY
Munn
ATTORNEYS.

THE NORRIS PETERS CO., PHOTO-LITHO., WASHINGTON, D. C.

No. 753,555. Patented March 1, 1904.

UNITED STATES PATENT OFFICE.

THOMAS DOUGLAS AND GEORGE LEWIS CONROY, OF LONDON, ENGLAND.

CONDENSER.

SPECIFICATION forming part of Letters Patent No. 753,555, dated March 1, 1904.

Application filed May 9, 1903. Serial No. 156,462. (No model.)

*To all whom it may concern:*

Be it known that we, THOMAS DOUGLAS and GEORGE LEWIS CONROY, subjects of the King of Great Britain, and residents of Baltic Wharf, Putney, London, England, have invented a new and Improved Condenser, of which the following is a full, clear, and exact description.

This invention relates to a condenser of that class in which one pipe is run through a second pipe, one pipe carrying the gas or vapor to be condensed and the other pipe carrying the condensing medium. Heretofore great difficulty has been experienced in connecting the outer to the inner pipe. Stuffing-boxes and glands have been employed, and owing to the pressure of the high-tensioned gases being cooled or condensed it is extremely difficult to keep the connections tight.

The object of this present invention is to remedy this defect, and we attain such end by reducing the diameter of the ends of the outer pipe until such ends are in contact with the inner pipe and then welding such reduced ends to the inner pipe to form an integral connection at each end of the outer pipe, the several outer pipes of the condenser being in communication with each other by connections intermediate their ends.

This specification is an exact description of one example of our invention, while the claims define the actual scope thereof.

Reference is to be had to the accompanying drawings, forming a part of this specification, in which similar characters of reference indicate corresponding parts in both views.

Figure 1:
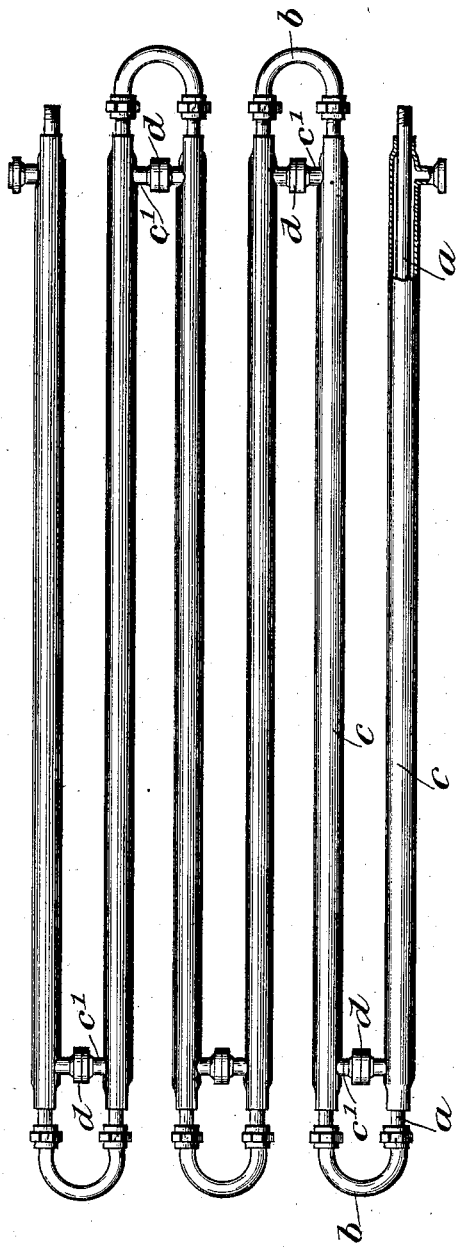
Figure 2:
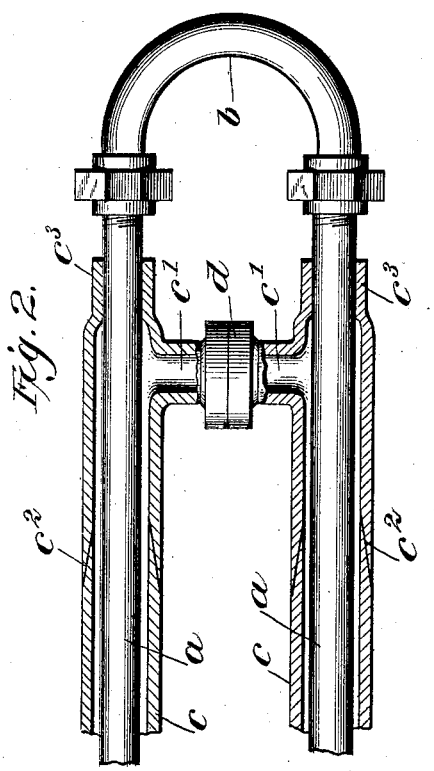

Figure 1 is a side elevation of a condenser constructed according to our invention, and Fig. 2 is an enlarged sectional view thereof.

$a$ indicates the inner pipes, which, as here shown, are arranged in parallelism, and $b$ indicates the connections between the ends of these pipes, all of which may be of the usual or any desired form.

$c$ indicates the outer pipes, through which the pipes $a$ are passed, as usual, and $c'$ indicates transverse nipples projecting from and communicating with the interior of the pipes $c$ and joined to each other by a connection $d$, which may be of any desired sort. By these elements the outer pipes are placed in communication with each other. The extreme portions of the outer pipes bearing the nipples $c'$ may be either integral parts of the outer pipes or, if desired, they may be formed separately therefrom and welded thereto.

In Fig. 2 the lines $c^2$ indicate that the extremities of the pipes $c$ are welded to the main portions; but it should be clearly understood that this is not essential to our invention.

The ends $c^3$ of the outer pipes are drawn down in diameter until they snugly engage the inner pipes $a$, and then the drawn portions $c^3$ are welded to the inner pipes, as indicated best in Fig. 2, to form at this point a practically integral connection between the two elements of the condenser. This construction renders leakage impossible, and the pipes being constructed of the same material contract and expand as a unit, so that there is no danger of disrupting the connection.

Various changes in the form, proportions, and minor details of our invention may be resorted to at will without departing from the spirit and scope thereof. Hence we consider ourselves entitled to all such variations as may lie within the intent of our claims.

Having thus described our invention, we claim as new and desire to secure by Letters Patent—

1. A condenser, comprising an inner and outer element, one of said elements having its end reduced in diameter snugly to engage the other element, and said parts being welded together at the said end, for the purpose specified.

2. A condenser, comprising an inner and an outer element, the inner element passing beyond the end of the outer element, and said end of the outer element being reduced in diameter snugly to engage the inner element and being welded thereto to form an integral joint.

3. A condenser, comprising inner pipes, outer pipes inclosing the same, the inner pipes projecting beyond the ends of the outer pipes and the ends of the outer pipes being reduced in diameter to engage the inner pipes and being welded thereto, connections between the ends of the inner pipes, and connections between the outer pipes, said latter connections passing from points intermediate the ends of the outer pipes.

4. A condenser, comprising an inner and an outer tubular element, the inner element being extended beyond the outer element and the outer element having an integral end portion reduced to snugly engage the projected portion of the inner element and being welded permanently thereto.

In testimony whereof we have signed our names to this specification in the presence of two subscribing witnesses.

THOMAS DOUGLAS.
GEORGE LEWIS CONROY.

Witnesses:
H. D. JAMESON,
A. NUTTING.